(12) United States Patent
Eichenberger et al.

(10) Patent No.: US 8,881,159 B2
(45) Date of Patent: Nov. 4, 2014

(54) CONSTANT TIME WORKER THREAD ALLOCATION VIA CONFIGURATION CACHING

(75) Inventors: Alexandre E. Eichenberger, Chappaqua, NY (US); John K. P. O'Brien, South Salem, NY (US)

(73) Assignee: International Business Machine Corporation, Armonk, NY (US)

( * ) Notice: Subject to any disclaimer, the term of this patent is extended or adjusted under 35 U.S.C. 154(b) by 597 days.

(21) Appl. No.: 13/070,811

(22) Filed: Mar. 24, 2011

(65) Prior Publication Data

US 2012/0246654 A1 Sep. 27, 2012

(51) Int. Cl.
G06F 9/46 (2006.01)
G06F 9/50 (2006.01)

(52) U.S. Cl.
CPC .................................. *G06F 9/5066* (2013.01)
USPC .......................................................... 718/102

(58) Field of Classification Search
None
See application file for complete search history.

(56) References Cited

U.S. PATENT DOCUMENTS

| 6,687,729 | B1 | 2/2004 | Sievert et al. | |
|---|---|---|---|---|
| 6,842,900 | B2 | 1/2005 | Sakamoto | |
| 2003/0014471 | A1* | 1/2003 | Ohsawa et al. | 709/107 |
| 2004/0199919 | A1 | 10/2004 | Tovinkere | |
| 2007/0101332 | A1* | 5/2007 | Courchesne et al. | 718/102 |
| 2009/0183156 | A1* | 7/2009 | Day et al. | 718/100 |
| 2009/0320040 | A1 | 12/2009 | Robison | |
| 2010/0153959 | A1 | 6/2010 | Song et al. | |
| 2010/0333091 | A1* | 12/2010 | Lin et al. | 718/100 |

OTHER PUBLICATIONS

Cappello, Franck et al., "MPI versus MPI+OpenMP on the IBM SP for the NAS Benchmarks", Supercomputing ACM/IEEE 2000 Conference, 2000, pp. 1-12.
Chun, Huang et al., "Performance Analysis and Improvement of OpenMP on Software Distributed Shared Memory Systems", Proceedings of EWOMP, 2003, 10 pages.
Furlinger, Karl et al., "Analyzing Overheads and Scalability Characteristics of OpenMP Applications", High Performance Computing for Computational Science, VEPCAR 2006 in Lecture Notes in Computer Science, vol. 4395/2007, 2007, 13 pages.
Schreiber, Olivier et al., "LS-DYNA® Implicit Hybrid Technology on Advanced SGI® Architectures", Adapted from Proceedings of 11th International LS-DYNA Users Conference, Dearborn, MI, Jun. 2010, pp. 1-19.

\* cited by examiner

*Primary Examiner* — Mengyao Zhe
(74) *Attorney, Agent, or Firm* — Francis Lammes; Stephen J. Walder, Jr.; William J. Stock

(57) ABSTRACT

Mechanisms are provided for allocating threads for execution of a parallel region of code. A request for allocation of worker threads to execute the parallel region of code is received from a master thread. Cached thread allocation information identifying prior thread allocations that have been performed for the master thread are accessed. Worker threads are allocated to the master thread based on the cached thread allocation information. The parallel region of code is executed using the allocated worker threads.

23 Claims, 10 Drawing Sheets

```
int main(int argc, char *argv[]) {
const int N = 100000;
int i, a[N];

#pragma omp parallel for
for (i = 0; i < N; i++)
a[i] = 2 * i;

return 0;
}
```

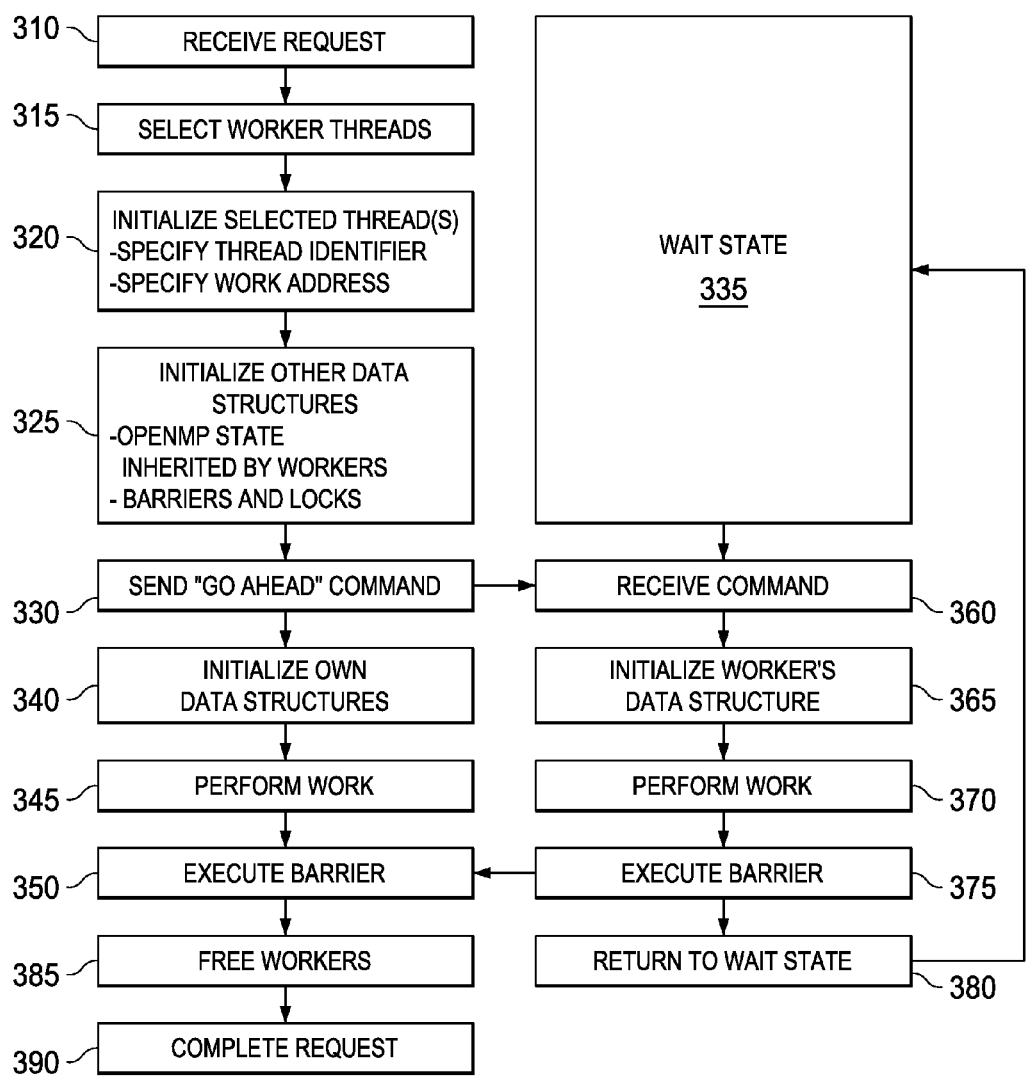

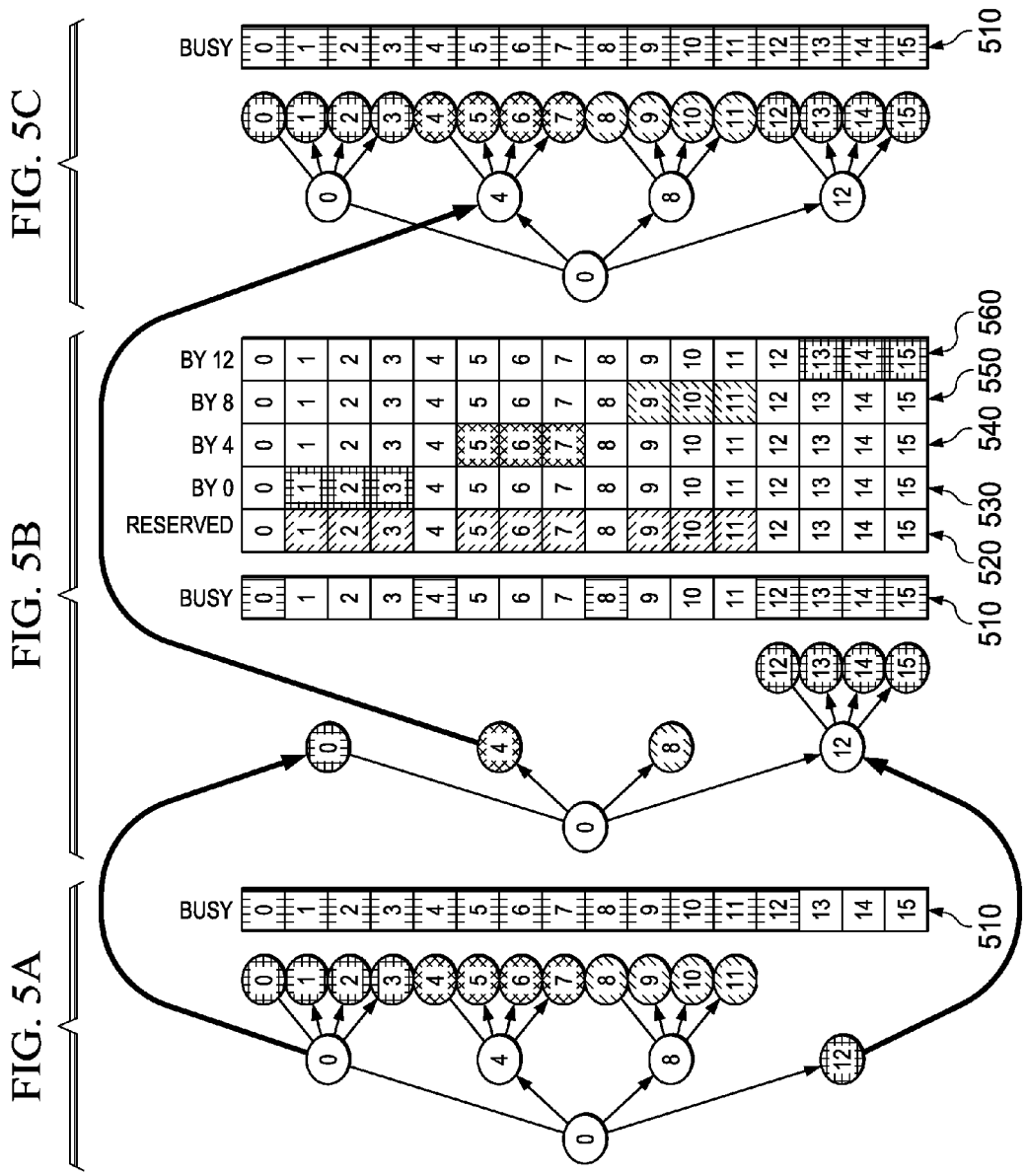

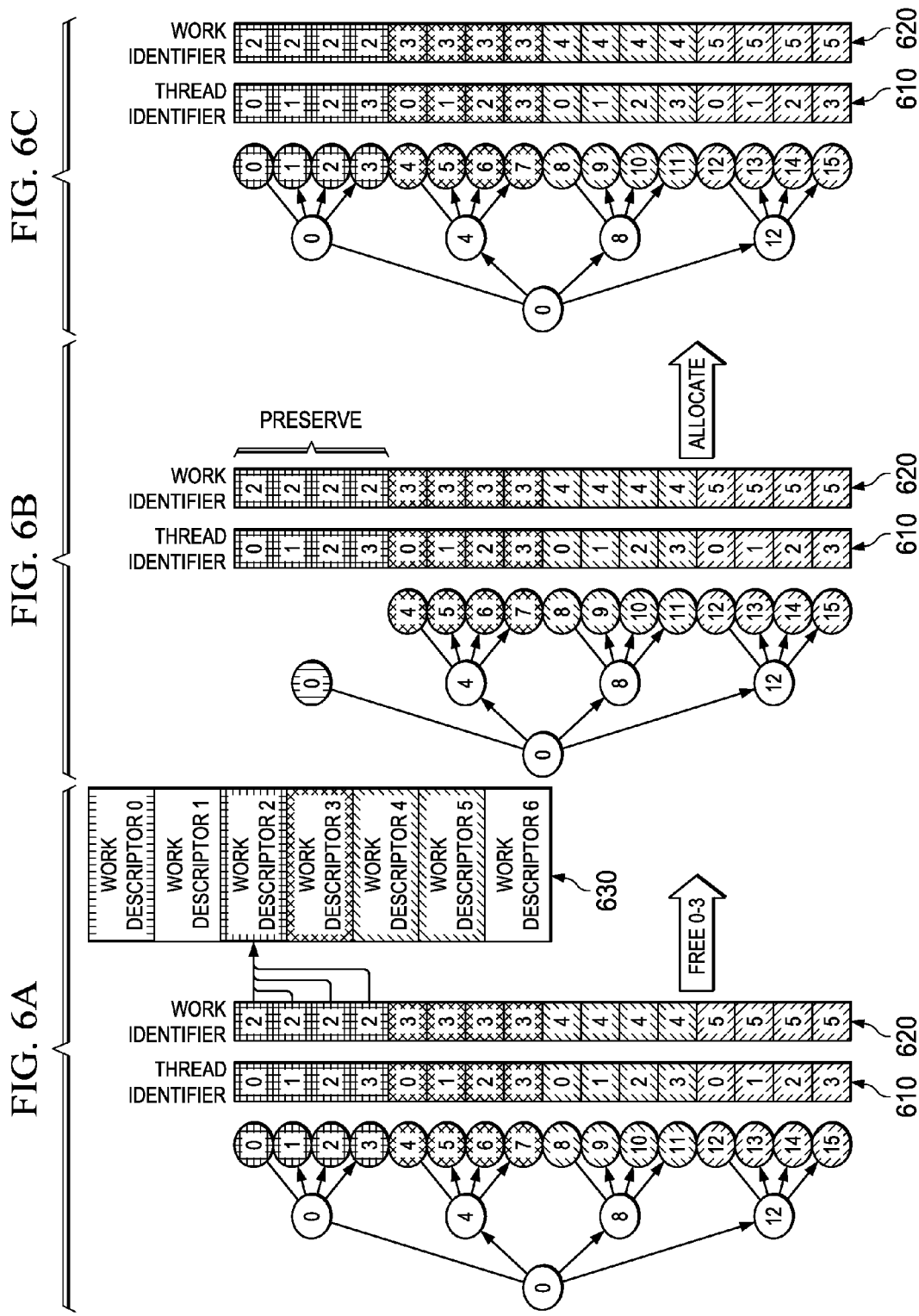

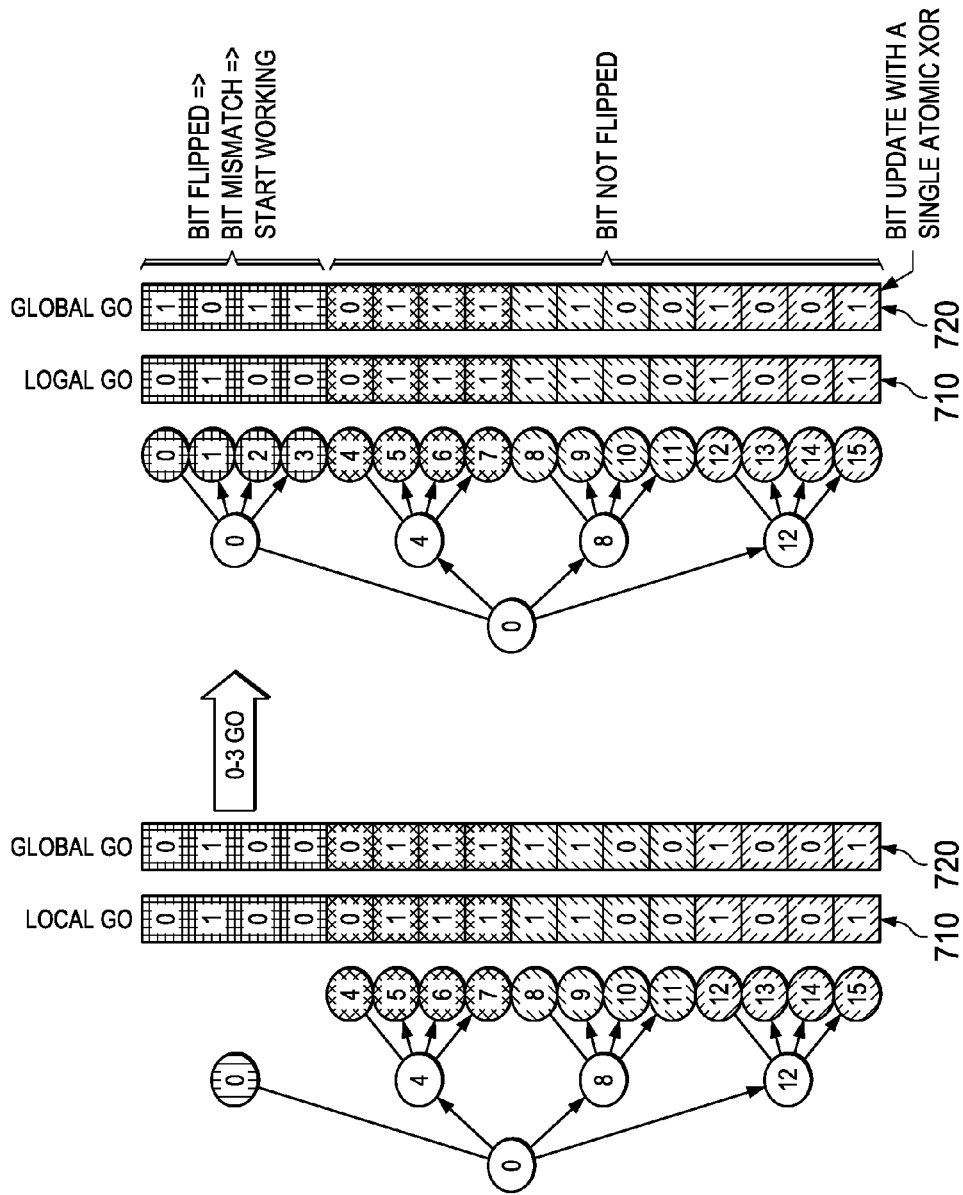

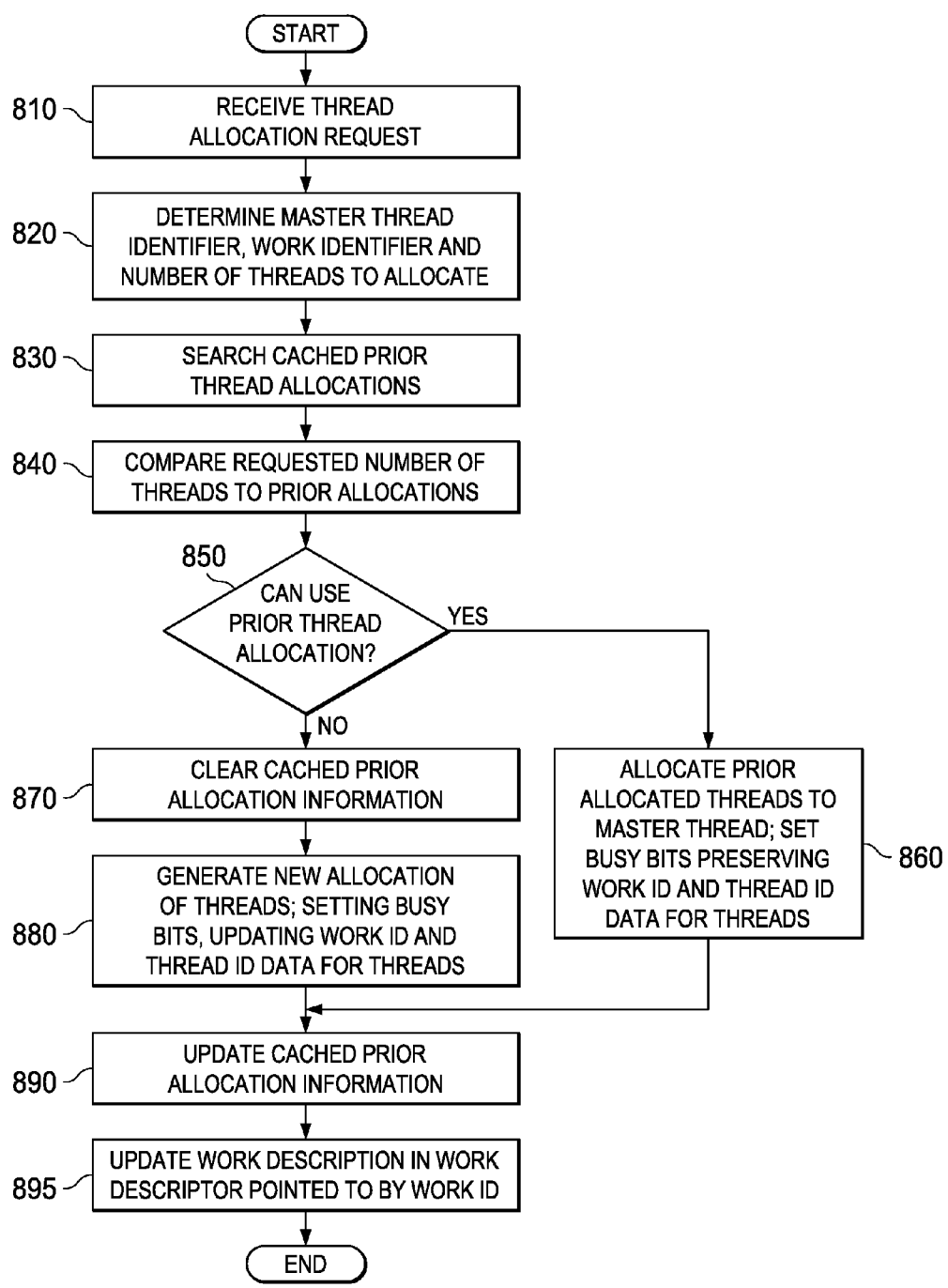

US 8,881,159 B2

CONSTANT TIME WORKER THREAD ALLOCATION VIA CONFIGURATION CACHING

This invention was made with Government support under Contract No.: B554331 awarded by the Department of Energy. The Government has certain rights in this invention.

BACKGROUND

The present application relates generally to an improved data processing apparatus and method and more specifically to mechanisms for allocating worker threads by utilizing configuration caching such that the allocation is performed in constant time.

Parallel processing systems and parallel programming are becoming more prevalent in today's computing environment. With such systems and programming, more than one computation/operation can be executed at substantially the same time. As a result, these computations and other operations can be performed such that the speed by which such computations and operations are performed is greatly increased. The parallel processing system provides greater throughput as a result.

Various standards for parallel processing have been developed. One standard is the OpenMP Application Program Interface (API). The OpenMP API supports multi-platform shared-memory parallel programming in C/C++ and Fortran on all architectures, including Unix platforms and Windows NT platforms. Jointly defined by a group of major computer hardware and software vendors, OpenMP is a portable, scalable model that gives shared-memory parallel programmers a simple and flexible interface for developing parallel applications for platforms ranging from the desktop to the supercomputer.

With OpenMP, as with other parallel processing standards, threads are selected to run a parallel task each time that a parallel region of code, such as a parallel loop construct in the code, is encountered during processing. There is a series of tasks that must be accomplished when creating a parallel region. After determining if the parallel region can proceed in parallel, and determining a number of threads that should be allocated for the particular parallel region, which thread(s) to use to process a parallel region of code are selected. Moreover, the selected threads must be informed of where to obtain the work to be performed so that the selected threads can execute the code associated with the parallel region.

Performing such thread selection is time consuming with the amount of time needed to perform such selection being proportional to the number of threads selected to execute the code in the parallel region. While this may be manageable when processors could execute at most a maximum of 4, 8, or even 16 threads in parallel, this becomes a significant time consumption factor in machines with a large number of parallel executing threads, e.g., 64, 128, or even more threads being executed in parallel.

SUMMARY

In one illustrative embodiment, a method, in a data processing system, is provided for allocating threads for execution of a parallel region of code. The method comprises receiving, from a master thread, a request for allocation of worker threads to execute the parallel region of code. The method further comprises accessing cached thread allocation information identifying prior thread allocations that have been performed for the master thread. The method also comprises allocating worker threads to the master thread based on the cached thread allocation information. Moreover, the method comprises executing the parallel region of code using the allocated worker threads.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3A-3C illustrate an example of an OpenMP methodology for performing the execution of a parallel region of code;

FIGS. 5A-5C illustrate a process of allocating and freeing threads with corresponding caching of a last thread allocation in accordance with one illustrative embodiment;

FIGS. 6A-6C illustrate a process of constant-time work notification using work descriptors and work identifiers in accordance with one illustrative embodiment;

FIGS. 7A-7B illustrate a process for constant time go-ahead notification using local go and global go vector registers in accordance with one illustrative embodiment;

FIG. 8 is a flowchart outlining an example operation for allocating worker threads to a master thread in accordance with one illustrative embodiment;

DETAILED DESCRIPTION

Figure 1:
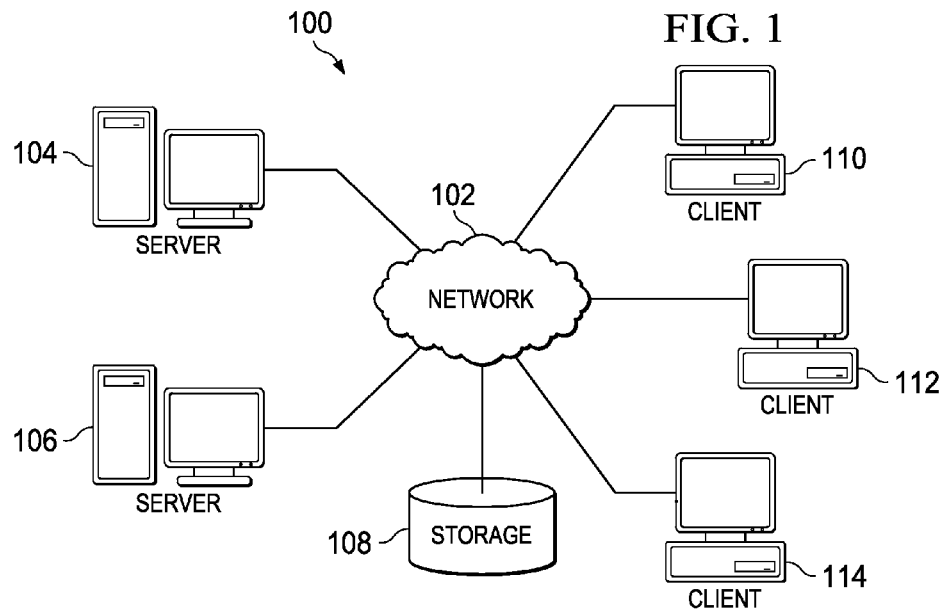
FIG. 1 is an example diagram of an example distributed data processing system in which aspects of the illustrative embodiments may be implemented.

The illustrative embodiments provide mechanisms for providing constant time worker thread allocation using configuration caching. The illustrative embodiments operate under the realization that applications often allocate and free the same threads repeatedly during execution of the application code. That is, application code often involves loops and other structures that are to be performed in parallel in such a manner that the same threads are repeatedly allocated and freed.

With the mechanisms of the illustrative embodiments, past worker thread allocation information is cached so that it may be used in making decisions as to which worker threads to allocate for future allocations and execution of code in a same or different parallel region of code. With this thread allocation caching mechanism, assuming that there is a "hit", i.e. a current thread requests a same number of threads for executing a parallel region of code as in a past allocation, and assuming that none of the threads in the past allocation have been reclaimed for other thread allocations, then one can reuse a past allocation in constant time using compact representations such as described hereafter.

This is very effective in practice since a significant portion of parallel regions use default configuration numbers for determining the number of threads that should take part in executing a parallel region of code. By caching a past allocation, and engineering a thread selection mechanism to not reuse, to the extent feasible for appropriate load balancing, threads that were previously allocated to a given thread allocation unless a same number of threads is being requested as described hereafter, one can actually ensure a very high degree of reuse of prior allocations.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
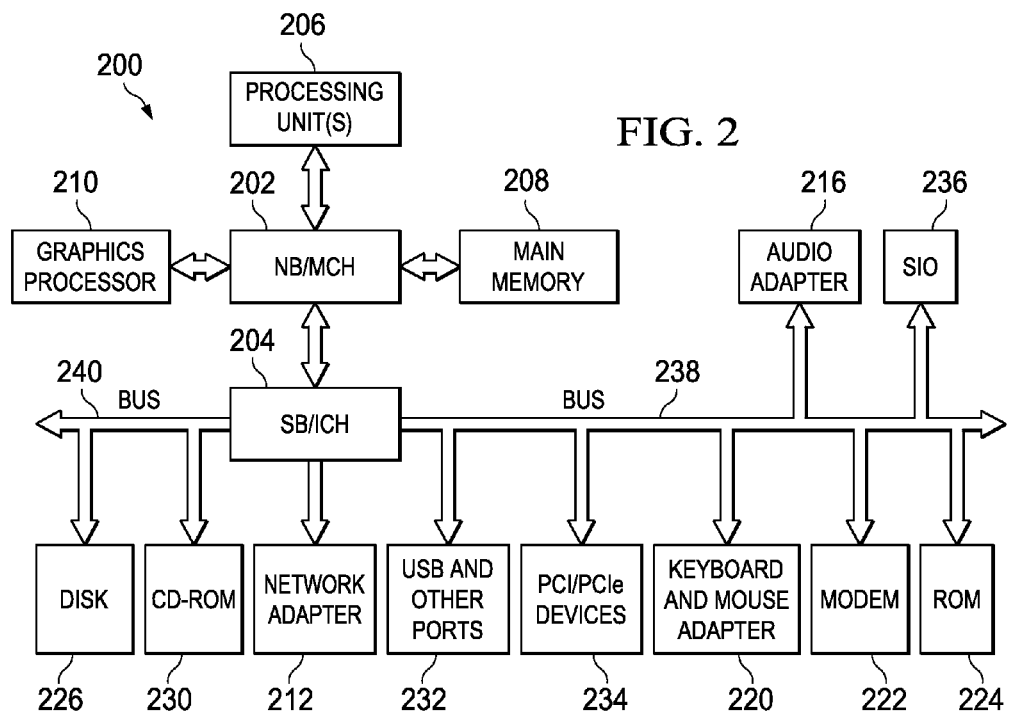
FIG. 2 is an example block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In accordance with the mechanisms of the illustrative embodiments, one or more of the data processing systems, e.g., the servers 104 or 106, or clients 110-114, in FIG. 1, or the data processing system 200 in FIG. 2, implements a parallel processing architecture for executing a plurality of threads of execution in a parallel nature. For example, the processing unit 206 in FIG. 2 may comprise a plurality of processing cores and each core may execute one or more threads of execution simultaneously. In one example, the data processing system 200 may be a simultaneous multi-threaded (SMT) 2 processor (able to process two threads simultaneously), SMT 4 processor (able to process four threads simultaneously), or the like.

In accordance with the mechanisms of the illustrative embodiments, the data processing system further implements a thread allocation mechanism that utilizes one or more thread allocation cache structures for storing information regarding the thread allocations that have occurred and uses this information to make decision as to which threads to allocate for performance of a parallel region of code. The details of how such thread allocation information is cached and used to make decisions regarding future thread allocations will be described in greater detail hereafter. However, to better understand the benefits and differences between the mechanism of the illustrative embodiments with regard to a known methodology for selecting worker threads, it is best to first understand an example of such a known methodology.

Figures 3A, 3C:
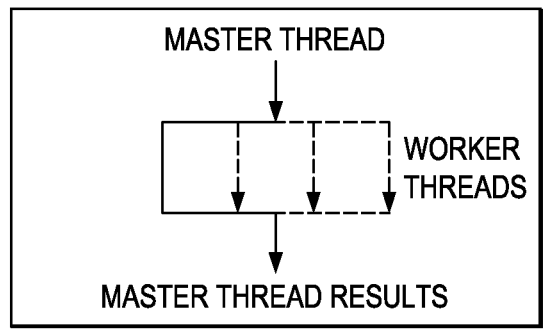

FIGS. 3A-3C illustrate an example of an OpenMP methodology for performing the execution of a parallel region of code. It is assumed, for purposes of the example in FIGS. 3A-3C that the user, or a compiler, has designated a portion of code to be a portion of code that is to be executed in parallel or can be executed in parallel, i.e. a parallel region of code. For example, a compiler may transform a parallel region's pragma statement (described hereafter) into a function call to the runtime environment. When the binary code is linked, i.e. all the code is put together including libraries support for input/output, printing, etc., the linkage is further performed with regard to an OpenMP runtime library, or other runtime library.

As shown in FIG. 3A, a program is being executed using a master thread represented by the solid dark line in FIG. 3A. The master thread, during execution of the program code, encounters a region of code that has been designated by the programmer or a compiler or the like, to be a region of code that is to be executed in parallel if possible, e.g., a loop in the code that can be parallelized by the compiler or otherwise indicated by the user as a loop that is to be executed in parallel. For example, in one illustrative embodiment, a compiler may analyze input scalar code and determine that certain portions of the scalar code can be executed in parallel. As a result, the compiler may modify the input scalar code for the identified portions so as to change the scalar code into parallelized code, e.g., single instruction multiple data (SIMD), multiple instruction multiple data (MIMD), or other type of parallelized code. In so doing, the compiler may insert statements, such as a pragma statement, that identifies the corresponding portion of code as one that can be executed in parallel and may optionally specify a number of threads to use when executing the portion of code in parallel as a parallel region of code.

When the master thread encounters the region of code that is to be executed in parallel, the master thread spawns additional worker threads by obtaining an allocation of worker threads from a pool of worker threads. In the depicted example in FIG. 3A, the master thread continues to perform work of the parallel region in parallel with the worker threads (shown as dashed lines in FIG. 3A). The worker threads return the results of their parallel execution to the master thread which then continues with the execution of the code after completion of the parallel region.

Looking at FIG. 3B, in order to spawn the worker threads, in accordance with the OpenMP standard, the master thread executes a function call to the runtime environment that instigates a request for the allocation of worker threads (310). The function call is performed by the master thread using parameters such as the number of requested threads (if any, otherwise a default number is utilized), the user function performing the work being requested to be done in parallel, etc.

The master thread selects worker threads (315) either based on an environment variable that specifies a number of worker threads to select or a default variable value that specifies a default number of worker threads if available, or if the default or environment variable specified number of worker threads is not available, then an available number of threads from 1 to the number of threads worker threads requested may be allocated. This number of worker threads requested is actually N−1 threads, where N is the total number of threads, since the master thread also performs some of the work of the parallel region, i.e. the master thread+N−1 worker threads=total number of threads N.

FIG. 3C is an example of code in which a compiler or user has inserted a "pragma" statement into the code to indicate that a portion of the code may be executed in parallel. As shown in FIG. 3C, the pragma statement "#pragma omp parallel for" indicates that the following "for" loop can be executed in parallel and should be executed in parallel. Since the pragma statement does not specify a number of threads to use to execute the "for" loop in parallel, a default number of threads may be used as specified by an environment variable, e.g., OMP_THREAD_NUM. An environment variable is one of a set of one or more dynamic variable values that can affect the way running processes behave on a computer by defining or creating an operating environment in which a process runs. As an example of a default environment variable value, the default number of threads may be two threads such that the "for" loop is executed using two threads, e.g., one thread performing a first number of iterations of the loop while the other thread performs the remaining iterations in parallel. If the user or compiler had inserted a pragma statement such as "#pragma omp parallel for thread_num(4)" for example, then a request for the "for" loop to be executed with four parallel threads would be made.

The particular threads that are selected can be selected in an arbitrary manner from a pool of worker threads. Particular runtimes may chose, for example, to distribute the workload among different cores evenly. For example, in a system with 4 threads per core and 8 cores, with a total of 4*8=32 threads, the runtime may decide to allocate 16 threads by selecting two threads per core in the system. The advantage of this approach is to even out the work among as many cores as possible. A runtime may also choose to pack the threads as densely as possible. For example, when creating a team of 4 worker threads, an OpenMP runtime in accordance with the illustrative embodiments may decide to select three more threads in the same core as the master thread. The advantage of this second approach is that all 4 threads will share the same cache hierarchy when assigned to a single core, and thus benefit from additional locality if the threads access common data. Other runtimes may chose to distribute the threads for some requests, and may pack threads for other request based on various criteria any implementation being within the spirit and scope of the illustrative embodiments.

Returning again to FIG. 3B, each of the selected threads are initialized (320) by notifying the thread of its assigned thread identifier, e.g., a number from 0 to Tnum−1 where Tnum is a total number of threads allocated, and notifying the thread of the location where it is to begin work for the parallel region, e.g., the function address or the like. Other data structures are initialized as well (325), e.g., barrier and lock data structures shared by the allocated threads, OpenMP state data structures inherited by worker threads, and the like.

The master thread then sends a "go ahead" command (330) to the worker threads which have been maintaining a wait state (335). The master thread initializes its own data structures (340) and then performs its work with regard to the parallel region (345). After completing its portion of work for the parallel region, the master thread executes a barrier instruction (350).

In parallel, in response to the "go ahead" command, the worker threads receive the command (360) and initialize their data structures (365). The worker threads then perform their work of the parallel region (370) and when this work is completed, they execute a barrier instruction (375). The worker threads then return to a wait state (380).

Once the worker threads have executed the barrier instruction, which writes a value to the barrier data structure indicating which threads have completed their work, the master thread knows that the worker threads have completed and can free the worker threads for future work (385). The master thread can then complete the request to execute the parallel region (390) returning the results of the parallel region of code's execution.

With this process, the selection of worker threads (315), initialization of the selected threads (320), sending of the "go ahead" command to the worker threads (330) and the freeing of the working threads (385) represent significant overhead to the performance of the parallel region of code. The mechanisms of the illustrative embodiments improve the execution of these portions of the master thread process by providing a mechanism for caching thread allocation information and using that information to determine how to allocate worker threads for future executions of parallel regions. The functionality, or at least portions of the functionality, of the illustrative embodiments may be implemented in an improved OpenMP runtime library, or other runtime library, that may be invoked by threads, such as a master thread and/or worker threads.

To improve these portions of the master thread OpenMP standard shown in FIG. 3B, the mechanisms of the illustrative embodiments utilize a plurality of vector registers for caching thread allocation information. The vector registers maintain thread allocation information that identifies which worker threads were previously allocated and to what master thread the worker threads were allocated. Moreover, vector registers for storing a thread identifier and work identifier are provided that, along with work descriptors, are used to inform threads of the work they are to perform. In addition, vector registers are provided for storing a "local go" and "global go" value for each of the possible threads and these vector register "local go" and "global go" values may be used to determine which threads to instruct to start their associated work.

Figure 4:
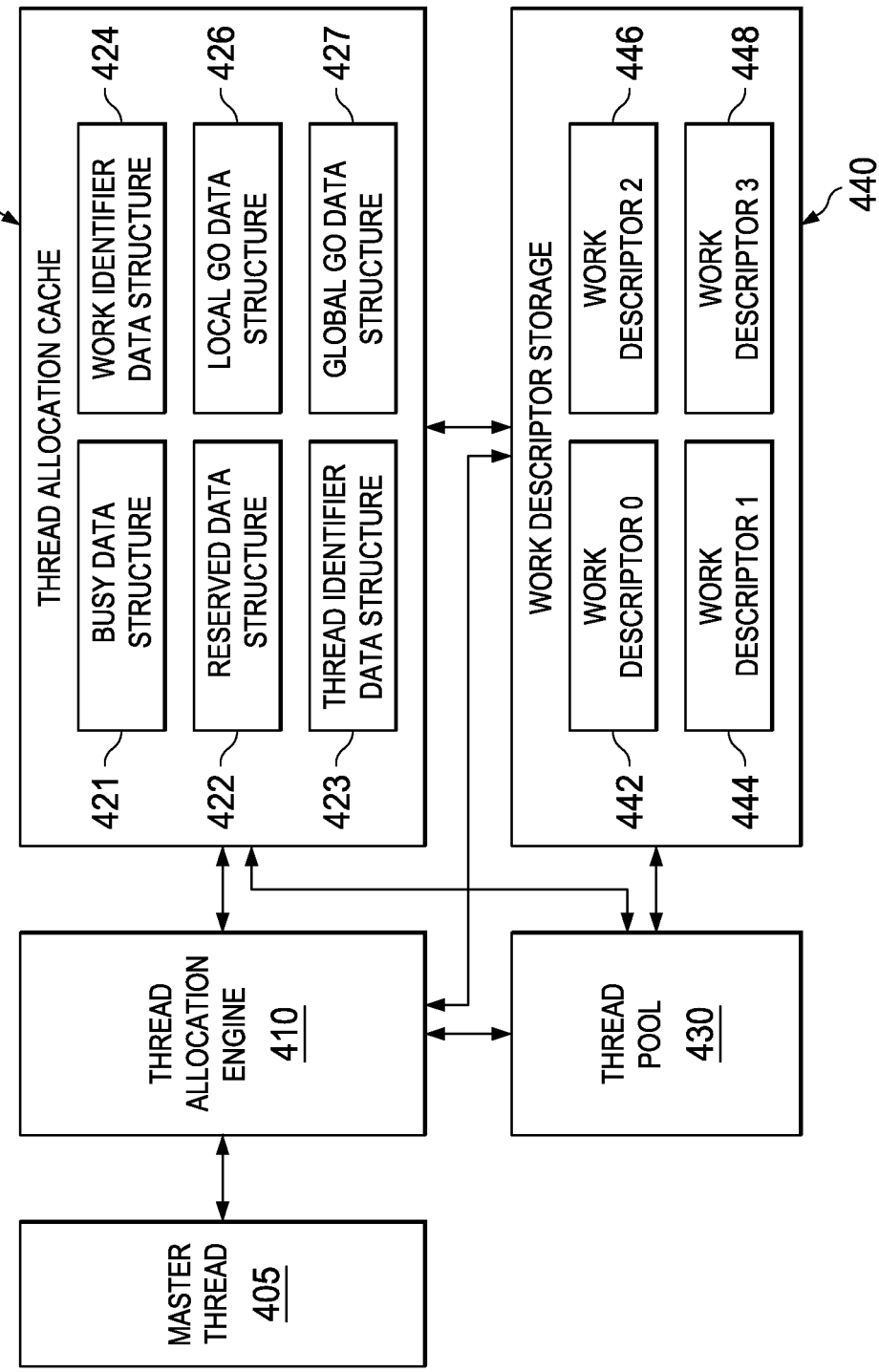
FIG. 4 is a block diagram of the primary operational elements of a thread allocation mechanism in accordance with one illustrative embodiment.

FIG. 4 is a block diagram of the primary operational elements of a thread allocation mechanism in accordance with one illustrative embodiment. The elements shown in FIG. 4 may be implemented in hardware, software, or any combination of hardware and software. In one illustrative embodiment, the elements shown in FIG. 4 are implemented as instructions executed by one or more processors of one or more data processing systems.

As shown in FIG. 4, the thread allocation mechanism includes a thread allocation engine 410 and a thread allocation cache 420. The thread allocation cache 420 may be considered to be a data structure stored in one or more registers of one or more memories of a data processing device, for example. In one illustrative embodiment, the thread allocation cache 420 utilizes vector registers that store a plurality of values, one for each possible thread that may be allocated simultaneously.

The thread allocation engine 410 implements the logic described herein with regard to performing thread allocations from the thread pool 430, informing the allocated threads of their work using work descriptors 442-448 in a work descriptor storage device 440, and releasing threads back to the thread pool 430 when the threads have completed their work. The releasing of the threads back to the thread pool 430 may further include operations for updating the thread allocation cache 420 to reflect the most recent allocation of threads by a master thread.

When a master thread 405 requires worker threads to execute a parallel region of code, the master thread 405 invokes the thread allocation engine 410 to select an appropriate set of worker threads to be allocated to the master thread for use in performing the required work. The invocation of the thread allocation engine 410 involves the master thread 405 sending a request to the thread allocation engine 410 that identifies the master thread's thread identifier (thread id) and the number of worker threads required, i.e. N−1 where N is the total number of threads to be used to process the parallel region of code. The thread allocation engine 410 accesses the thread allocation cache 420 and uses the thread allocation information in the thread allocation cache 420 to determine which worker threads to allocate to the master thread 405, if any.

The thread allocation cache 420 comprises a busy data structure 421, a reserved data structure 422, thread identifier data structure 423, a work identifier data structure 424, a local go data structure 426, and a global go data structure 427. These data structures may be stored in one or more memory devices, such as one or more vector registers or the like. These data structures may be dynamically created in response to the entry by a master thread into a parallel region of code. That is, the data structures 422-427 may be associated with a particular parallel region of code and may store thread allocation information for that parallel region of code and may be discarded after the execution of the parallel region of code is completed. The data structures 422-427 may also be associated with a particular thread in a particular parallel region of code and may store thread allocation information for that thread in that parallel region of code and may be discarded after the execution of that thread in that parallel region of code is completed. Alternatively, the data structures may be more permanent and may store thread allocation information for multiple parallel regions of code or multiple entries into the same parallel region of code.

The busy data structure 421 stored values indicative of which threads are currently allocated. The reserved data structure 422 stores values indicative of which threads were previously allocated and to which master threads they were allocated. The thread identifier data structure 423 stores thread identifiers for threads. The work identifier data structure 424 stores a work descriptor identifier for the threads so as to identify which work descriptor 442-448 corresponds to which thread. The work descriptor storage 440 stores one or more work descriptors for use by threads in identifying a location of the work that they are to perform. The local go data structure 426 and global go data structure 427 store values that are compared to determine which worker threads should commence work, as described hereafter.

Using the thread allocation cache 420, the thread allocation engine 410 determines based on the thread identifier of the master thread 405 and the number of worker threads requested by the master thread 405, how many and which ones of the worker threads to allocate to the master thread. The selected worker threads are then allocated to the master thread 405 from the thread pool 430. The thread allocation engine 410 writes a thread identifier for the worker threads to corresponding memory locations of the thread identifier data structure 423. The master thread writes a work descriptor 442-448 for the allocated worker threads, identifying an address at which the worker threads are to being execution, and optionally a work descriptor id to a corresponding memory location in work identifier data structure 424. The local and global go data structures 426 and 427 are then utilized to generate a "go ahead" command to the allocated threads, as will be described in greater detail hereafter, so that the worker threads may then commence their work at the location specified in the work descriptor.

Once the work has been completed for the parallel region of code, or alternatively after thread allocation, the thread allocation engine 410 updates the information stored in the thread allocation cache 420 to reflect the most recent thread allocation. The functionality summarized above will now be described in greater detail with reference to FIGS. 5A-7B.

It is assumed, for purposes of illustration, that in the examples shown in FIGS. 5A-7B that the particular processor architecture supports up to 16 simultaneously executing threads, i.e. the processor is a simultaneous multi-threaded (SMT) 16 processor architecture. For purposes of illustration only, it is assumed that each thread spawns up to an additional 4 threads, however this is not a limitation of the illustrative embodiments and any number of threads may be spawned in other implementations without departing from the spirit and scope of the illustrative embodiments. It is further assumed that the data structures of the thread allocation cache are stored in vector registers where each vector register has one or more bits for a total number of threads supported by the processor architecture, e.g., in the depicted example there is a minimum of 16 bits, one bit for each of the 16 threads that is the maximum number of simultaneously executing threads supported by the example processor architecture.

While these assumptions will be used for illustration purposes, it should be appreciated that the present invention is not limited to such assumptions or the examples shown in FIGS. 5A-7B. To the contrary, the illustrative embodiments of the present invention may include any number of threads that may be simultaneously executed and data storage that may include any number of bits for each of the threads, without departing from the spirit and scope of the present invention. For example, on a machine that can represent vectors of up to 128 bits per hardware vector register, an embodiment storing a vector of 256 bits in memory would split this 256 bit vector in two 128 bit quantities that it could load separately from memory, operate on, and then store again into memory.

FIGS. 5A-5C illustrate a process of allocating and freeing threads with corresponding caching of a last thread allocation in accordance with one illustrative embodiment. In FIGS. 5A-5C a busy vector register 510 and a set of reserved vector registers 520-560 are provided for storing thread allocation information. The busy vector register 510 stores entries specifying which threads are currently allocated to perform work, such as on a parallel region of code. The set of reserved vector registers 520-560 store, for each possible worker thread, an indication as to which master thread most recently allocated that thread.

As shown in FIG. 5A, an example set of threads (depicted as numbered ovals in FIGS. 5A-5C) are executing one or more parallel regions of code. In the depicted example, a master thread 0 has spawned three additional threads 4, 8, and 12. The numbering of the threads in FIGS. 5A-5C is for illustration purposes only and do not reflect the actual thread identifiers associated with the threads. As will be described in FIGS. 6A-6C, the thread identifiers may be different from the thread numbers in FIGS. 5A-5C and are assigned in relation to their master thread in accordance with the OpenMP standard.

Thus, in the depicted example, threads 4, 8, and 12 are worker threads for master thread 0. In addition, as shown in FIG. 5A, threads 0, 4, and 8 spawn additional worker threads 1-3, 5-7, and 9-11 to perform work for various parallel regions of code. Thus, threads 4 and 8 are master threads for threads 5-7 and 9-11.

A busy vector register 510 comprises a bit for each of a maximum number of threads, e.g., 16 in this example. As threads are allocated or spawned, the corresponding bit in the busy vector register 510 is set to indicate that the thread has been allocated for performing work. Thus, in the depicted example, the bits for threads 0-12 have been set (as represented by the shaded boxes) while the bits for threads 13-15 have not been set since these threads have not yet been allocated.

At a later time, represented in FIG. 5B, the worker threads 1-3, 5-7, and 9-11 have completed their work on the respective parallel regions of code. As a result, their corresponding bits in the busy vector register 510 have been cleared or reset to indicate that these threads are free for reallocation from the thread pool. When these worker threads are freed, or alternatively in response to the allocation of the worker threads to a master thread, bits corresponding to these worker threads are set in one or more of the reserved vector registers 520-560 in order to preserve the thread allocation information for future thread allocation determinations.

As shown in FIG. 5B, the set of reserved vector registers 520-560 comprises a global reserved vector register 520 that stores bit values indicative of the union of the other reserved vector registers 530-560. In essence, the global reserved vector register 520 has bits set for each worker thread that has been allocated at some time in the past. Thus, by looking at global reserved vector register 520, the thread allocation engine can determine which threads have previously been allocated and which threads have not yet been previously allocated.

In addition to the global reserved vector register 520, master thread reserved vector registers 530-560 are provided for each of the master threads 0, 4, 8, and 12. Bits may be set in respective ones of the master thread reserved vector registers 530-560 to indicate which worker threads have been allocated to the master thread. For example, as shown in FIG. 5B, since threads 1-3 were allocated to the master thread 0, the bits associated with worker threads 1-3 are set in the master thread reserved vector register 530 which is associated with master thread 0. Similarly, the bits for worker threads 5-7 are set in the master thread reserved vector register 540 which is associated with the master thread 4. In a same way, the bits for the worker threads 9-11 are set in the master thread reserved vector register 550 which is associated with the master thread 8.

It should be noted that the bits for master threads 0, 4, 8, and 12 are not set in this example because in one implementation of the illustrative embodiments the last allocation is stored in the reserved vector registers when the thread is freed and thus, a bit is not stored in both the "reserved" and "busy" vector registers at the same time. In such an implementation, thread 0 for example will eventually have the bits for threads 4, 8, and 12 set in its "reserved by 0" vector register 530. In an alternative implementation, reserved bits could be set as threads are allocated or the reserved vector registers 520-560 may be redefined as "busy or reserved" in which case the bits for threads 0, 4, 8, and 12 may be set in these vector registers 520-560.

The reserved vector registers 520-560 may be used to determine which worker threads to allocated to master threads in response to requests from the master threads for worker threads. In one embodiment the thread allocation logic, when selecting worker threads to allocate to a master thread, first attempts to allocate worker threads that have been previously allocated to the same master thread. That is, for example, if master thread 4 again requests worker threads, and the number of worker threads requested is the same as, or smaller than, a previously allocated number of worker threads, then the previously allocated worker threads may again be allocated to the master thread 4. For example, if master thread 4 requests between 1 to 3 worker threads, and master thread 4 previously had threads 5-7 allocated to it, then threads 5-7 may again be allocated to master thread 4. In this way, the worker threads 5-7 may be reused by master thread 4. The same may be true for any of the other master threads 0, 8, and 12. This is shown in FIG. 5C, for example.

In another embodiment, if the number of threads being requested by the master thread 4 is less than the number of worker threads previously allocated to master thread 4, then the previous allocation information in the reserved vector register 540 is voided and a new allocation of worker threads is generated from within the threads previously allocated to master thread 4. That is, for example, a new allocation of worker threads from within the range of threads 5-7 is generated. For example, if master thread 4 is requesting only 2 worker threads, rather than the previously allocated 3 worker threads, then 2 of the worker threads 5-7 are selected and allocated to the master thread 4, e.g., threads 5 and 7 may be allocated to master thread 4.

In one embodiment, if the number of threads being requested by the master thread 4 is greater than the number of threads previously allocated to master thread 4, then the previously cached allocation information is voided and a new allocation of threads is created with subsequent updating of the reserved vector registers 520-560. For example, if the master thread 4 were to request 5 worker threads, then the allocation of worker threads 5-7 may be voided in reserved vector register 540, and a new allocation of worker threads 5-7 and 13 may be generated with corresponding bits in the reserved vector registers 520 and 540 being set.

In an other embodiment, when the number of threads requested by the master thread 4 is greater than the number of threads previously allocated to master thread 4, then the OpenMP runtime determines if it can reduce the number of threads allocated to master thread 4. Indeed, OpenMP Application Programming Interface of the illustrative embodiments allows the runtime to allocate fewer threads than requested in certain circumstances. For example, the user, or compiler, can indicate using an environment variable OMP_DYNAMIC or by using a function call omp_set_dynamic( ) that it is appropriate for the runtime to allocate fewer threads than requested as the runtime see fit. Alternatively, the user, or compiler, may have requested a number of threads that is greater than the total number of threads currently available. When this is the case, the runtime is again at liberty to assign any numbers of threads to master thread 4, ranging from no additional thread to the currently available number of threads. In summary, there are cases where the runtime is free to select the numbers of threads that will be assigned to thread 4. In such case, this other embodiment can use the size of the previously cached allocated information to determine a number of threads to assign to the master thread so as to be compatible with the previously cached allocated information. As a result, the previously cached allocation information does not need to be voided and can be reused to satisfy this current request as well, even though the user or compiler had originally asked for a larger number of threads than is presently indicated in the previously cached allocation.

With the thread allocation logic of the illustrative embodiments, stealing of threads that were previously reserved by other master threads is avoided. Thus, even though threads 9-11 may be available for allocation, and master thread 12 is requesting 3 worker threads, the thread allocation logic does not select threads 9-11 if there are other threads available that have not been previously allocated to a master thread. If possible, the thread allocation logic attempts to allocate worker threads that have been previously allocated to the same master thread. If that is not possible, then the thread allocation logic attempts to allocate worker threads from a pool of threads that have not been previously allocated to master threads. If that is not possible, then a determination is made as to whether a subset of the requested number of threads may be allocated from either available threads that have been previously allocated to the master thread or from threads that have not been previously allocated. If this is not possible, then the allocation of worker threads may return an indication that the allocation of worker threads was not possible.

In the depicted example of FIG. 5B, since master thread 12 is requesting 3 worker threads, and worker threads 13-15 have not been previously allocated to other master threads, and to avoid stealing any of threads 1-3, 4-7, or 9-11 from the master threads to which they were previously allocated, threads 13-15 are allocated to master thread 12. In the depicted example of FIG. 5C, in subsequent requests for worker threads, assuming that each master thread requests the same number of threads that were previously allocated to the master threads, the previously allocated worker threads are reused by reallocating them to their corresponding master threads.

Thus, with the thread allocation logic of the illustrative embodiments, when allocating worker threads from a pool of threads, if there are not enough available threads for the allocation, then a last allocation cached for the master thread is voided. If the request is for a different number of worker threads than requested a last time by the master thread, the last allocation information in the cache is voided and a new thread allocation is created with subsequent update of the cached thread allocation information. If the request is for the same number of threads as in the last thread allocation for the master thread, then the same worker threads are again allocated to the master thread.

All of these operations (with the exception of looking for new available threads when there is no prior cached allocation or the prior allocation cannot be reused, for example, because the current request is asking for more threads than reserved in the cached allocation) are performed in constant time or "near constant time," meaning that we can perform such operations by one, two, or a few operations. In particular, constant time indicates that these operations do not have costs that are proportional to the size of the team of worker threads being reserved and/or the number of threads in the system. It is assumed here that the total number of threads in the system can be loaded, operated, or stored in one operation. This is the case for machines with, for example, 64-bit integer support and for runtimes with no more than 64 threads. This is also the case for machines with 128-bit SIMD engines supporting AND/OR/XOR logical operations and for runtimes with no more than 128 threads. If that were not the case, e.g., one needed to support 256 threads on a machine with 128-bit SIMD engines, then the operation time is no longer constant, as two 128 bit operations would be needed to support the 256 bit logical AND/OR/XOR operations required. However, having two or even 4 operations is still very low overhead, which could be qualified as "near-constant-time."

After thread allocation is performed, such as described above with regard to FIGS. 5A-5C, the allocated worker threads are informed of their thread identifier and where to find the work that the allocated worker threads are to perform. This is done through the use of thread identifiers in a thread identifier vector register, work identifiers in a work vector register, and work descriptors. These structures and their use are described in greater detail with regard to FIGS. 6A-6C.

FIGS. 6A-6C illustrate a process of constant-time work notification using work descriptors and work identifiers in accordance with one illustrative embodiment. As shown in FIG. 6A, each thread that is allocated to a master thread is given a corresponding thread identifier in the thread identifier vector register 610. The master thread is given thread identifier 0 with the worker threads being given thread identifiers 1 to N−1, e.g., 1-3. The thread identifiers uniquely identify the thread to its master thread. The thread identifiers are assigned in accordance with the OpenMP standard.

The work identifiers in the work identifier vector register 620 stores a pointer to a work descriptor 630 specifying the starting address of the work that is to be performed by the worker threads. That is, the master thread may specify a starting address of a portion of code to be executed by the worker threads. The work identifier in the work identifier vector register 620 points to a corresponding work descriptor 630 and through the user of the work identifier, the work threads are able to obtain the starting address at which they are to begin execution. The work identifiers are preserved even after freeing the worker threads and the work identifiers can be reused when the same worker threads are being allocated to the same master thread. Thus, in order to cause the worker threads to perform different work in a subsequent allocation, the thread allocation logic need only update the work descriptor to point to a different starting address at which the worker threads are to begin execution.

For example, as shown in FIG. 6A, the worker threads 1-3 allocated to master thread 0 are given thread identifiers 1-3 in thread identifier vector register 610. In addition, the thread allocation logic writes the starting address for these worker threads to the work descriptor 2 630 and sets a pointer, "2" in this example, in the work identifier vector register 620 that points to the work descriptor 2 630. Thus, worker threads 1-3, in order to determine the work that they are to perform, identify this work by following the pointer in the work identifier vector register 620 to the work descriptor 2 630.

When threads 0-3 are freed, as shown in FIG. 6B, the thread identifiers in thread identifier vector register 610 and work identifiers in the work identifier vector register 620 are preserved. When the threads 0-3 are again allocated, as shown in FIG. 6C, the same thread identifiers and work identifiers in the vector registers 610 and 620 are reused. The work descriptor 2 630 is updated with the new starting address of the work that is to be performed by the newly allocated threads. Thus, the need to assign new thread identifiers and new work identifiers is minimized through the use of the mechanisms of the illustrative embodiments when reusing thread allocations. All that is necessary is that the work descriptor be updated.

Once the master side initialization operations are completed, including the thread selection and allocation, and setting up of the thread identifier, work identifier, and work descriptor information in FIGS. 5A-6C, the master thread sends a go ahead signal to the worker threads. The illustrative embodiments provide a mechanism for quickly and in constant time, providing go ahead signals to worker threads.

FIGS. 7A-7B illustrate a process for constant time go-ahead notification using local go and global go vector registers in accordance with one illustrative embodiment. As shown in FIGS. 7A and 7B, a local go vector register 710 is provided with one or more bits associated with each of the possible threads. The bits in the local go vector register 710 are updated in response to a given thread determining that the bits that it is assigned to in the local go vector are not the same as the bits that it is assigned to in the global go vectors. In other words, the local go vector register 710 has its value changed only when a worker thread determines that work is ready for it. The value of the local go vector register 710 associated with a given worker thread is changed by the worker thread so that the local go vector register 710 matches the current value of the global go vector register 720 associated with this worker thread. In addition, a global go vector register 720 is provided that also stores one or more bits associated with each of the possible threads. The bits in the global go vector register 720 are flipped in response to the master thread wanting to start the thread associated with the bits being flipped. Initially, both the local and the global go vector registers 710-720 are initialized to the same values, e.g. they are cleared for all entries. In other words, the global go vector register 720 has its value changed only when a master thread wants to notify one or more given worker threads that some work is ready for the one or more given worker threads.

In response to the master thread completing its initialization operations for starting a parallel region of code, the master thread causes the bits in the global go vector register 720 for the master thread and its worker threads to be flipped. If there is a difference between corresponding bits of the local go and global go vector registers 710 and 720, as may be determined by an XOR operation or the like, corresponding worker threads exit their idle wait state and access the thread identifier and work identifiers in the vector registers of FIGS. 6A-6C to begin performing the work that they are assigned to perform for the master thread.

For example, as shown in FIGS. 7A and 7B, initially, the local and global go vector registers 710 and 720 match. The bits in the global go vector register 720 corresponding to master thread 0 and its worker threads are then flipped while the remaining bits are not flipped. As a result, the bits in the global go vector register 720 with regard to threads 0-3 are different from the bits in the local go vector register 710 with regard to threads 0-3. As a result, threads 0-3 exit their idling loop and initiate their work in the parallel region of code, i.e. the threads 0-3 are awakened. Thereafter, each of the awakened threads 0-3 copy the value of the bits in the global go vector registers 720 associated with each awakened thread 0-3 into the corresponding value in the local go vector register 710. When the local go and global go vector registers 710 and 720 are again different, the corresponding threads are again awakened. Note that because the master thread is already awaken (i.e. not idle), another embodiment may choose not to include the master thread in the set of threads for which the local and global go vector registers are changed. It is also understood that while the embodiments described herein use the value 0 and 1 within the local and global go vector registers 710-720, other embodiments may use any other two or more values without departing from the spirit and scope of the illustrative embodiments. Similarly, in the above embodiments, worker threads are awaken by determining that the local and global go values are different. In another embodiment, the worker thread are awaken when the values are the same, and remain idle while the values are distinct.

Thus, the illustrative embodiments provide mechanisms for allocating threads for use in executing parallel regions of code in a parallel manner. The mechanisms of the illustrative embodiments cache past thread allocations and configurations and data structures for the threads so that they may be reused. New allocations of threads are steered away from prior thread allocations and configurations so that the prior thread allocations and configurations can increasingly be reused. The operations of the thread allocations and freeing of threads are performed in constant time. Re-computing known configurations is avoided as is having to perform communication of known configurations to worker threads by reusing thread allocations and maintaining work identifiers and thread identifiers between allocations so that they may be reused.

FIG. 8 is a flowchart outlining an example operation for allocating worker threads to a master thread in accordance with one illustrative embodiment. As shown in FIG. 8, the operation starts by receiving a thread allocation request from a master thread (step 810). The master thread identifier, work identifier, and number of threads to allocate is determined (step 820). As mentioned above, the number of threads may be specified in an environment variable value, a default value, or the like.

The cached prior thread allocation information is search (step 830) and the number of threads requested is compared to the number of thread in a prior allocation of threads to the master thread (step 840). A determination is made as to whether a prior allocation of threads can be reused (step 850). For example, this may involve determining if the number of threads requested is equal to or less than the number of threads previously allocated to the master thread in a prior allocation. If so, then the prior allocation of threads may be again allocated to the master thread by setting busy bits and preserving work id and thread id data for the threads (step 860). If not, then the cached prior allocation information may be cleared (step 870) and a new allocation of threads may be generated by setting busy bits and updating work id and thread id data for the threads (step 880). Thereafter, or if the prior allocation of threads is reused, then the cached prior allocation information may be updated to reflect the current allocation of worker threads to the master thread as well as the current allocation of the work descriptor to the master and worker threads (step 890). The work description in the work descriptor pointed to by the work ID is then updated (step 895). The operation then terminates.

Figure 9A:
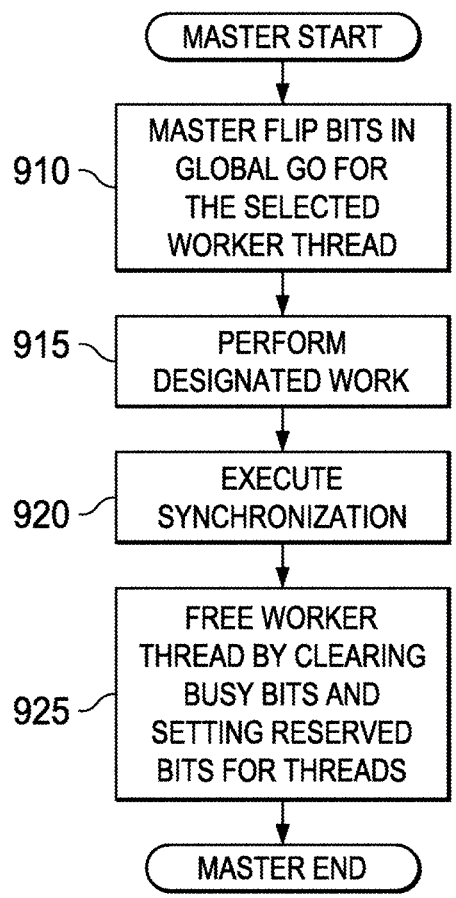
FIG. 9A is a flowchart outlining a master thread operation for sending a go ahead signal for performing work by the worker threads and then freeing the working threads in accordance with one illustrative embodiment.

FIG. 9A is a flowchart outlining a master thread operation for sending a go ahead signal for performing work by the worker threads and then freeing the working threads in accordance with one illustrative embodiment. As shown in FIG. 9A, the operation starts with the master thread flipping bits in the global go vector register for the selected worker threads that are to be started (step 910). The master thread then performs its portion of the work of the parallel region of code (step 915) and, once the portion of work is done, e.g., a barrier operation is called or the like, a synchronization with the worker threads is performed (step 920). Step 915 may still include some initialization to be done for the master thread by the runtime prior to and/or after the actual work specified by the user. The worker threads are then freed, busy bits are cleared, and reserved bits for the threads are set in the master thread's reserved vector register (step 925). In step 925 the current work descriptor is not preserved, i.e. it is not returned to the pool of available work descriptors. In fact, work descriptors are released only when a prior work descriptor was already preserved with this master thread and a new work descriptor is currently associated with the master thread. In such cases, the prior work descriptor is released and entered so as to allow preserving the current work descriptor. The master thread operation then terminates.

Figure 9B:
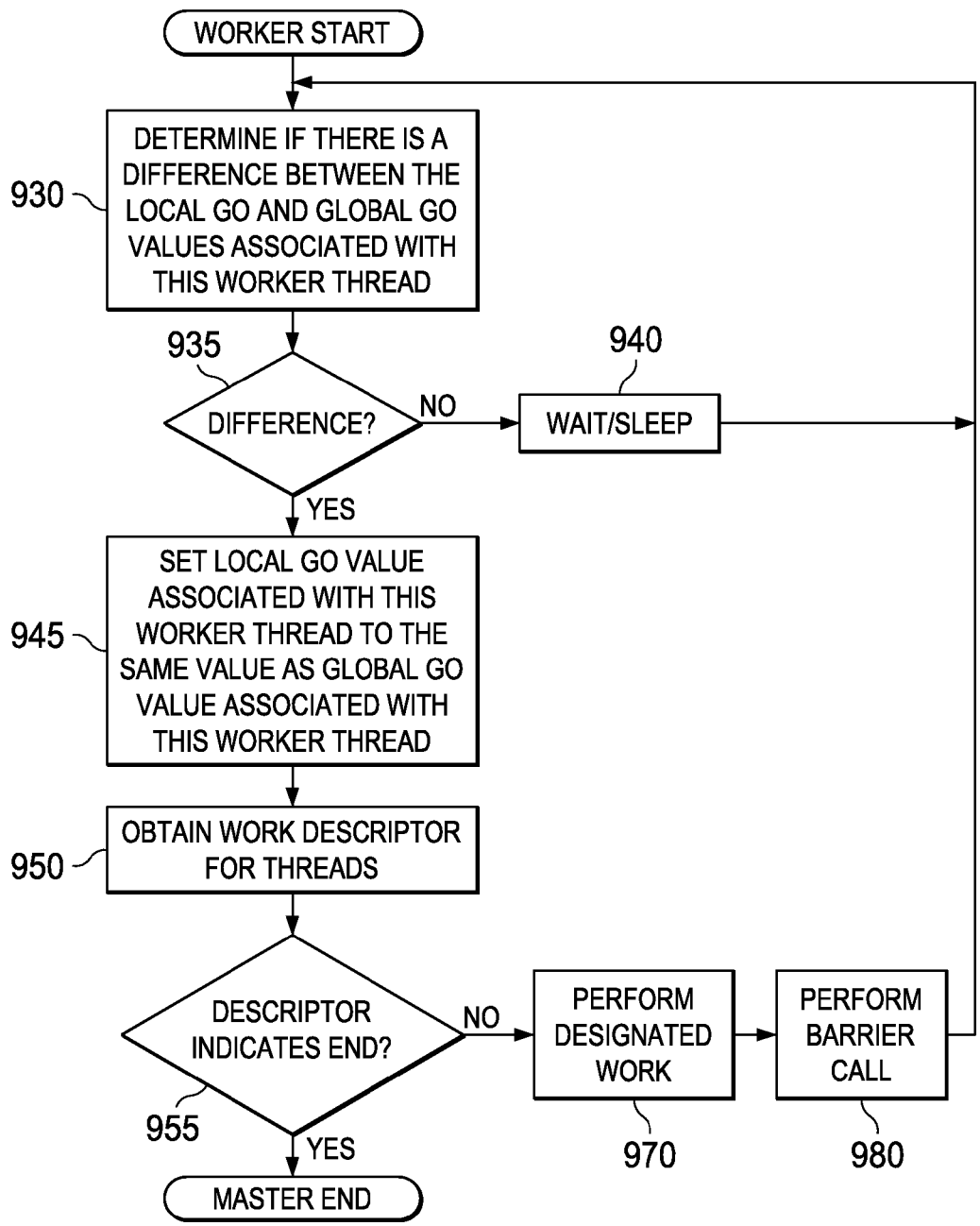
FIG. 9B is a flowchart outlining a worker thread operation for initiating work assigned from a master thread in accordance with one illustrative embodiment.

FIG. 9B is a flowchart outlining a worker thread operation for initiating work assigned from a master thread in accordance with one illustrative embodiment. As shown in FIG. 9B, the worker thread starts with a determination as to whether there is a difference between the local go vector register and the global go vector register values associated with this worker thread (step 930). If there is no difference (step 935) then the worker thread may wait/sleep and the operation returns to step 930.

If there is a difference in the local go and global go vector register values for the worker thread, then the local go value associated with this worker thread is set to the same value as the global go value associated with this worker thread (step 945). The work descriptor for the worker thread is obtained (step 950) and a determination is made as to whether the work descriptor indicates that the execution of the parallel region of code is at an end of this parallel region of code (step 955). If so, the master thread and worker threads end their operation. Otherwise, the designated work identified in the work descriptor is performed (step 970) and when complete, a barrier call or other synchronization function call is performed (step 980). Step 970 may still include some initialization to be done for this worker thread by the runtime prior to and/or after the actual work specified by the user. The operation then returns to step 930 and awaits a subsequent wake up of the worker thread.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for allocating threads for execution of a parallel region of code, comprising:
    receiving, from a master thread executing in a processor of the data processing system, a request for allocation of one or more worker threads to execute the parallel region of code;
    accessing, from a cache storage of the data processing system, cached thread allocation information identifying prior thread allocations that have been performed for the master thread;
    allocating, by one or more processors of the data processing system, one or more worker threads to the master thread based on the cached thread allocation information; and
    executing, by the one or more processors of the data processing system, the parallel region of code using the allocated one or more worker threads, wherein executing the parallel region of code using the allocated worker threads comprises:
        comparing, by each of the one or more allocated worker threads, a local go value corresponding to the worker thread, in a local go vector register, to a global go value corresponding to the worker thread, in a global go vector register;
        causing the worker thread to exit an idle state in response to the comparison indicating a mismatch between the local go value and the global go value, wherein a work identifier is retrieved from a work identifier vector register in response to the worker thread exiting the idle state.

2. The method of claim 1, wherein the cached thread allocation information identifies which worker threads, from a pool of threads, have been previously allocated to one or more master threads.

3. The method of claim 1, further comprising:
    accessing, from a busy vector register, busy information identifying which threads, from a pool of threads, are currently allocated to perform work; and
    allocating the one or more worker threads based on a setting of bits in the busy vector register.

4. The method of claim 1, wherein the cache storage comprises one or more reserved vector registers corresponding to one or more master threads, and wherein each of the one or more reserved vector registers comprises a bit for each thread in a pool of threads.

5. The method of claim 4, wherein a bit in a reserved vector register of the one or more reserved vector registers is set in response to one of a corresponding worker thread being allocated, from the pool of threads, to a master thread corresponding to the reserved vector register, or a freeing, back to the pool of threads, of a worker thread that has been allocated to the master thread corresponding to the reserved vector register.

6. The method of claim 1, wherein, in response to the number of worker threads to allocate being greater than the previous number of worker threads previously allocated to the master thread, allocating one or more worker threads further comprises:
    clearing bits set in a reserved vector register corresponding to the master thread;
    selecting one or more worker threads to allocate to the master thread that do not have bits set in the one or more reserved vector registers; and
    updating a setting of bits in the reserved vector register corresponding to the master thread based on the selection of one or more worker threads to allocate to the master thread.

7. The method of claim 1, wherein, in response to the number of worker threads to allocate being less than the previous number of worker threads previously allocated to the master thread, allocating one or more worker threads further comprises:
    selecting one or more worker threads to allocate to the master thread that were previously allocated to the master thread as identified in the reserved vector register corresponding to the master thread; and
    updating a setting of bits in the reserved vector register corresponding to the master thread based on the selection of one or more worker threads to allocate to the master thread.

8. The method of claim 1, wherein executing the parallel region of code using the allocated worker threads comprises:
    writing, by the master thread, a description of work to be performed by the worker threads to a work descriptor data structure;
    retrieving, from the work identifier vector register, a work identifier for each of the one or more worker threads allocated to the master thread, wherein the work identifier points to the work descriptor; and
    executing, by the allocated one or more worker threads, work identified in the work descriptor.

9. The method of claim 8, wherein the work identifier for each of the one or more worker threads is preserved between allocations of the same one or more worker threads to one or more master threads.

10. The method of claim 1, wherein the master thread flips the setting of bits corresponding to the one or more allocated worker threads in the global go vector register in response to allocation of the one or more allocated worker threads to the master thread, and wherein the flipped bits corresponding to the one or more allocated worker threads in the global go vector are copied to corresponding bits in the local go vector register after performing the comparison.

11. The method of claim 1, wherein the cached thread allocation information identifies which work descriptor, from a pool of work descriptors, has been previously allocated to one or more master threads.

12. The method of claim 11, wherein a work descriptor remains out of the pool of available work descriptors while the work descriptor is identified by the thread allocation information as a work descriptor that has been previously allocated to one or more master threads.

13. A computer program product comprising a non-transitory computer readable storage medium having a computer readable instructions stored therein, wherein the computer readable instructions, when executed on a processor of a data processing system, causes the data processing system to:
  receive a request for allocation of one or more worker threads to execute a parallel region of code;
  access cached thread allocation information identifying prior thread allocations that have been performed for the master thread;
  allocate one or more worker threads to the master thread based on the cached thread allocation information; and
  execute the parallel region of code using the allocated one or more worker threads, wherein the computer readable instructions further cause the data processing system to execute the parallel region of code using the allocated worker threads by:
    comparing, by each of the one or more allocated worker threads, a local go value corresponding to the worker thread, in a local go vector register, to a global go value corresponding to the worker thread, in a global go vector register;
    causing the worker thread to exit an idle state in response to the comparison indicating a mismatch between the local go value and the global go value, wherein a work identifier is retrieved from a work identifier vector register in response to the worker thread exiting the idle state.

14. The computer program product of claim 13, wherein the computer readable instructions further cause the data processing system to:
  access, from a busy vector register, busy information identifying which threads, from a pool of threads, are currently allocated to perform work; and
  allocate the one or more worker threads based on a setting of bits in the busy vector register.

15. The computer program product of claim 13, wherein the cache storage comprises one or more reserved vector registers corresponding to one or more master threads, and wherein each of the one or more reserved vector registers comprises a bit for each thread in a pool of threads.

16. The computer program product of claim 13, wherein, in response to the number of worker threads to allocate being greater than the previous number of worker threads previously allocated to the master thread, the computer readable instructions further cause the data processing system to allocate one or more worker threads by:
  clearing bits set in a reserved vector register corresponding to the master thread;
  selecting one or more worker threads to allocate to the master thread that do not have bits set in the one or more reserved vector registers; and
  updating a setting of bits in the reserved vector register corresponding to the master thread based on the selection of one or more worker threads to allocate to the master thread.

17. The computer program product of claim 13, wherein, in response to the number of worker threads to allocate being less than the previous number of worker threads previously allocated to the master thread, the computer readable instructions further cause the data processing system to allocate one or more worker threads by:
  selecting one or more worker threads to allocate to the master thread that were previously allocated to the master thread as identified in the reserved vector register corresponding to the master thread; and
  updating a setting of bits in the reserved vector register corresponding to the master thread based on the selection of one or more worker threads to allocate to the master thread.

18. The computer program product of claim 13, wherein the computer readable instructions further cause the data processing system to execute the parallel region of code using the allocated worker threads by:
  writing, by the master thread, a description of work to be performed by the worker threads to a work descriptor data structure;
  retrieving, from the work identifier vector register, a work identifier for each of the one or more worker threads allocated to the master thread, wherein the work identifier points to the work descriptor; and
  executing, by the allocated one or more worker threads, work identified in the work descriptor.

19. The computer program product of claim 18, wherein the work identifier for each of the one or more worker threads is preserved between allocations of the same one or more worker threads to one or more master threads.

20. The computer program product of claim 13, wherein the master thread flips the setting of bits corresponding to the one or more allocated worker threads in the global go vector register in response to allocation of the one or more allocated worker threads to the master thread, and wherein the flipped bits corresponding to the one or more allocated worker threads in the global go vector are copied to corresponding bits in the local go vector register after performing the comparison.

21. An apparatus, comprising:
  a processor; and
  a memory coupled to the processor, wherein the memory comprises instructions which, when executed by the processor, cause the processor to:
  receive a request for allocation of one or more worker threads to execute a parallel region of code;
  access cached thread allocation information identifying prior thread allocations that have been performed for the master thread;
  allocate one or more worker threads to the master thread based on the cached thread allocation information; and
  execute the parallel region of code using the allocated one or more worker threads, wherein the instructions further cause the processor to execute the parallel region of code using the allocated worker threads by:
    comparing, by each of the one or more allocated worker threads, a local go value corresponding to the worker thread, in a local go vector register, to a global go value corresponding to the worker thread, in a global go vector register;
    causing the worker thread to exit an idle state in response to the comparison indicating a mismatch between the local go value and the global go value, wherein a work identifier is retrieved from the work identifier vector register in response to the worker thread exiting the idle state.

22. The method of claim 4, wherein allocating one or more worker threads to the master thread based on the cached thread allocation information comprises:
  determining a number of worker threads to allocate to the master thread;
  determining if the number of worker threads to allocate is greater than a previous number of worker threads previously allocated to the master thread, as identified by a reserved vector register corresponding to the master thread; and
  selecting one or more worker threads based on whether or not the number of worker threads to allocate is greater than the previous number of worker threads previously allocated to the master thread.

23. The computer program product of claim 15, wherein the computer readable instructions further cause the data processing system to allocate one or more worker threads to the master thread based on the cached thread allocation information by:
  determining a number of worker threads to allocate to the master thread;
  determining if the number of worker threads to allocate is greater than a previous number of worker threads previously allocated to the master thread, as identified by a reserved vector register corresponding to the master thread; and
  selecting one or more worker threads based on whether or not the number of worker threads to allocate is greater than the previous number of worker threads previously allocated to the master thread.

* * * * *